United States Patent [19]

Matsuda et al.

[11] 4,348,654

[45] Sep. 7, 1982

[54] TIRE INTERNAL PRESSURE MONITORING AND DISPLAY APPARATUS FOR TIRED VEHICLES

[75] Inventors: Akira Matsuda, Higashimurayama; Yoshihiro Hayakawa, Akigawa; Shigeo Yasuda; Motoaki Iwasaki, both of Musashino, all of Japan

[73] Assignee: Bridgestone Tire Company Limited, Tokyo, Japan

[21] Appl. No.: 214,898

[22] Filed: Dec. 9, 1980

[30] Foreign Application Priority Data

Dec. 29, 1979 [JP] Japan .................................. 54/170654

[51] Int. Cl.³ .............................................. B60C 23/02
[52] U.S. Cl. .................................... 340/58; 200/61.25
[58] Field of Search ............. 340/58; 200/61.22, 61.25

[56] References Cited

U.S. PATENT DOCUMENTS 2,794,875 6/1957 Trinca .................................... 340/58
3,523,451 8/1970 Kohn ..................................... 340/58
4,180,795 12/1979 Matsuda et al. ...................... 340/58

Primary Examiner—Alvin H. Waring
Attorney, Agent, or Firm—Sughrue, Mion, Zinn, Macpeak & Seas

[57] ABSTRACT

A tire internal pressure control apparatus for tired vehicles comprising a resonance coil assembly secured to a rotational body of a vehicle and an oscillation coil assembly secured to a stationary vehicle body side, these assemblies being distant apart from each other and electromagnetically coupled with each other and operative to produce resonance phenomenon and generate a signal sensitive to the internal pressure of the tire. The signal is displayed at a driver's seat without utilizing any expensive and complex integrated circuit.

5 Claims, 11 Drawing Figures

TIRE INTERNAL PRESSURE MONITORING AND DISPLAY APPARATUS FOR TIRED VEHICLES

BACKGROUND OF THE INVENTION

1. Field of the Invention

This invention relates to a tire internal pressure control apparatus for tired vehicles, and more particularly to a tire internal pressure control apparatus for a tired electric train which can generate an alarm at a driver's seat when the internal pressure of the tire is decreased to a value which is lower than a given value.

2. Description of the Prior Art

In the above mentioned kind of the tire internal pressure control apparatus heretofore proposed, the internal pressure of the tire is supplied through a rubber hose to a pressure indicator which is provided with a normally open pressure switch. When the internal pressure of the tire is decreased, the normally open pressure switch is closed to generate an electric signal which is transmitted through a slip ring to a non-rotational side of the vehicle, that is, a vehicle body side. At the vehicle body side, the electric signal received is supplied through a relay to a display device at a driver's seat, thereby giving an alarm.

In such conventional alarm apparatus, use is made of the slip ring for the purpose of transmitting the signal delivered from the rotational side of the vehicle, that is, a rotational body to the stationary side thereof, that is, the vehicle body. As a result, a brush of the slip ring becomes considerably worn and hence its slip ring must be changed to a new one after the lapse of a given time and the apparatus required much maintenance. In addition, if water penetrates into the slip ring, an erroneous signal is frequently generated and hence the apparatus becomes unreliable in operation. Moreover, the slip ring must be removed and mounted everytime the tires are changed in positions or the tire is changed into a new one. As a result, the apparatus is troublesome in operation and the slip ring in itself is considerably expensive.

Another tire internal pressure alarm apparatus which does not make use of a slip ring but makes use of a non-contact electrical coupling for the purpose of transmitting signals from the rotary body of the vehicle to the stationary body thereof has also been proposed.

But, such kind of conventional tire internal pressure alarm apparatus makes use of an integrated circuit as a signal treatment logical circuit. The integrated circuit is very expensive and hence the apparatus as a whole becomes considerably expensive. In addition, the use of the integrated circuit makes the circuit complex in construction and provides the disadvantage that the apparatus is frequently subjected to faults, erroneous operation or the like.

Moreover, such conventional apparatus cannot generate an alarm when the apparatus in itself becomes defective.

SUMMARY OF THE INVENTION

An object of the invention, therefore, is to provide a tire internal pressure control apparatus for tired vehicles which can eliminate the above mentioned drawbacks which have been encountered with the prior art techniques, which makes use of a non-contact means for transmitting signals from a rotational body of a vehicle to a stationary vehicle body thereof and of constructional parts which are less expensive and highly reliable in operation.

Another object of the invention is to provide a tire internal pressure control apparatus for tired vehicles which is provided with a so-called fail-safe mechanism operative to generate an alarm even when the apparatus in itself becomes defective.

A feature of the invention is the provision of a tire internal pressure control apparatus for tired vehicles comprising a rubber hose connected to a valve provided on a tire for vehicles, a pressure indicator secured to that position of a rotational body of the vehicle which is near the center of a rotational shaft of said rotational body and operative to indicate the internal pressure of the tire supplied from the tire through said rubber hose, a pressure switch incorporated into said pressure indicator and operative to transduce a decrease in the internal pressure of the tire to a value lower than a given value into an electrical signal, a resonance coil assembly electrically connected to said pressure switch and secured to a given position on the periphery of said rotational body so as to transmit a signal for detecting a decrease of the internal pressure of the tire to a stationary body side of the vehicle, an oscillation coil assembly secured to that position of the vehicle body side which is near said rotational body and operative to normally generate a high frequency signal, said resonance coil assembly being brought into a position opposed to and near said oscillation coil assembly everytime said rotational body is rotated by one turn to generate a signal sensitive to the internal pressure of the tire in response to the presence or absence of the resonance of said coil assembly, a controller connected to said oscillation coil assembly and operative to treat said signal delivered from said oscillation coil assembly and a signal representing the presence or absence of the run of the vehicle so as to generate an alarm signal, and a display device connected to said controller and displaying said alarm signal delivered from said controller to a driver.

Further objects and features of the invention will be fully understood from the following detailed description with reference to the accompanying drawings, wherein:

DETAILED DESCRIPTION OF THE PREFERRED EMBODIMENTS

Figure 1:
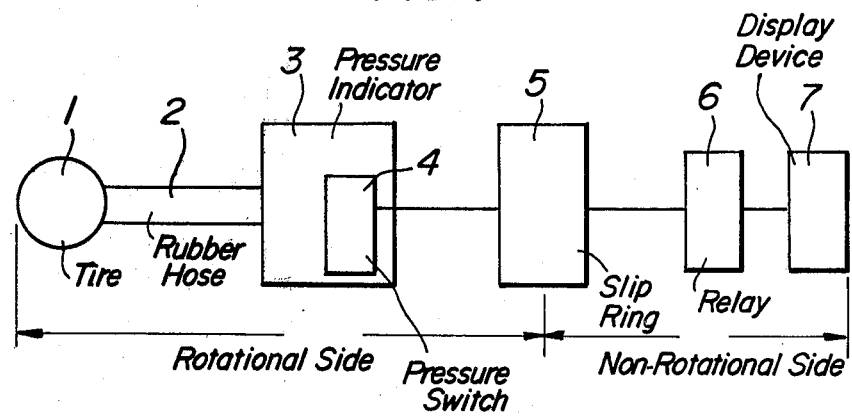
FIG. 1 is a block diagram of a conventional tire internal pressure alarm apparatus.

FIG. 1 shows a conventional tire internal pressure alarm apparatus. In FIG. 1, reference numeral 1 designates a tire, 2 a rubber hose, 3 a pressure indicator connected through the rubber hose 2 to the tire 1, 4 a normally open pressure switch incorporated into the pressure indicator 3 and operative to be closed when the internal pressure of the tire 1 is decreased so as to generate an electric signal, and 5 a slip ring interposed between a rotational side of the vehicle and a non-rotational side thereof and operative to transmit the electrical signal delivered from the pressure switch 4 to the non-rotational side of the vehicle, that is, the vehicle body side. At the vehicle body side, the electric signal received is supplied through a relay 6 to a display device 7 provided at a driver's seat, thereby generating an alarm at the display device 7.

As described above, the conventional tire internal pressure alarm apparatus shown in FIG. 1 has the disadvantages that the slip ring 5 becomes considerably worn and hence is required to be frequently replaced by a new one after the lapse of a given time and required to frequently effect maintenance, that if water is penetrated into the slip ring 5 erroneous alarms may be generated to degrade the reliability of the apparatus, that in the case of changing the tire position or the tire is replaced by a new one, the slip ring 5 must be removed from and thus mounted on a wheel, and as a result, the apparatus is troublesome in maintenance and that the slip ring 5 in itself is significantly expensive.

In addition, another conventional tire internal pressure alarm apparatus which does not make use of a slip ring but makes use of a non-contact electromagnetic coupling for the purpose of transmitting signals from a rotational body of a vehicle to a vehicle body side has the disadvantage that the use of an integrated circuit as a logical circuit for treating signals makes the apparatus as a whole considerably expensive and makes the circuit complex and hence the apparatus is frequently defective and erroneous in operation, and that the apparatus could not give alarm when the apparatus in itself becomes defective.

Figure 2:
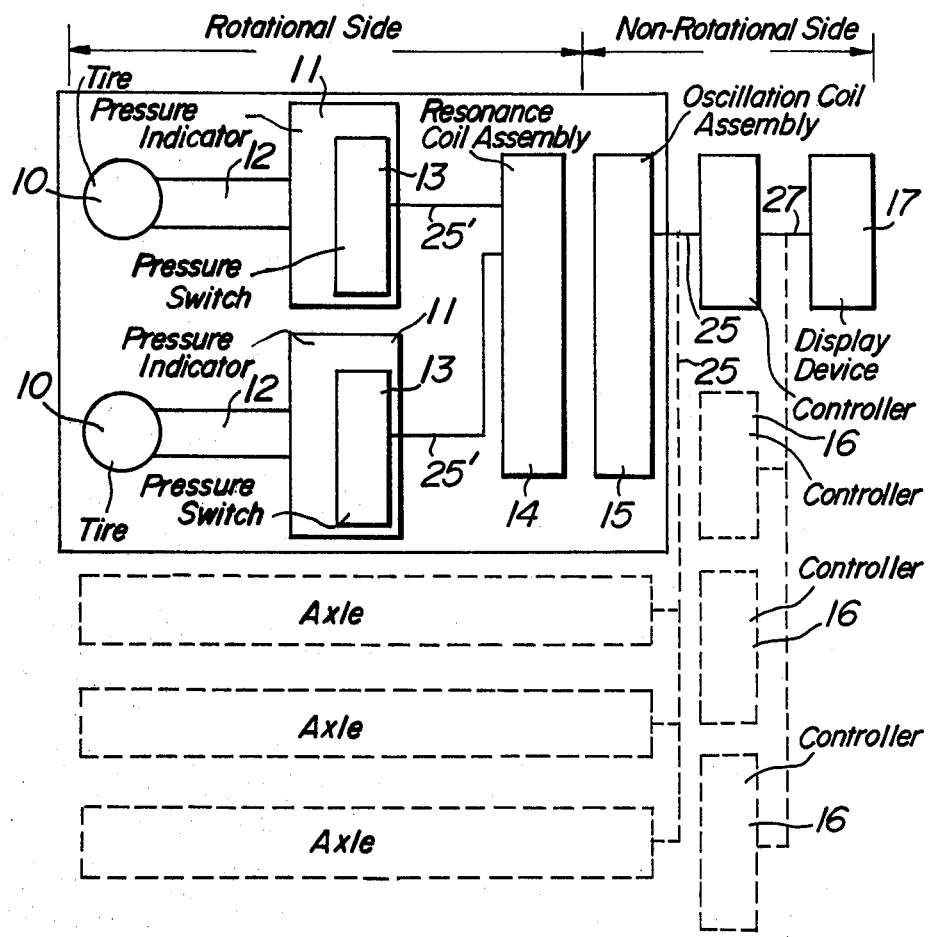
FIG. 2 is a block diagram of one embodiment of a tire internal pressure control apparatus according to the invention.

FIG. 2 shows one embodiment of a tire internal pressure control device according to the invention. In the present embodiment, a tire internal pressure control apparatus is provided at a rotational side of a vehicle with a tire 10, a pressure indicator 11 for indicating the internal pressure of the tire 10, pressure transmission hose 12 for connecting the tire 10 to the pressure indicator 11, pressure switch 13 incorporated into the pressure indicator 11 and operative by a given internal pressure of the tire 10 and resonance coil assembly 14 operative by the pressure switch 13. The tire internal pressure control apparatus is provided at a non-rotational side of the vehicle, that is, at a vehicle body side with an oscillation coil assembly 15, controller 16 for controlling the output delivered from the oscillation coil assembly 15 to generate an alarm signal and a display device 17 operable by the alarm signal delivered from the oscillation coil assembly 15 to generate a signal and display it.

Figure 3:
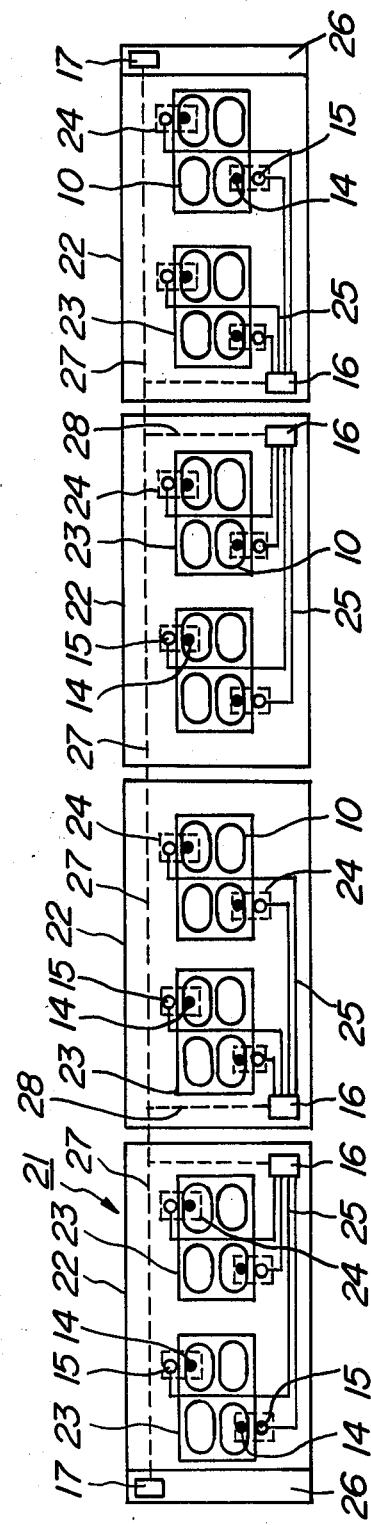
FIG. 3 is a diagrammatic plan view of the apparatus according to the invention applied to a monorail tired train.

FIG. 3 shows the tire internal pressure control device constructed as shown in FIG. 2 and applied to a vehicle used in practice, for example, a monorail tired train composed of four cars each provided with pneumatic tires. The invention is not limited to such monorail tired train only, but may be applied to any tired vehicle equipped with pneumatic tires.

As can be seen from FIG. 3, a train 21 is composed of four cars 22 each including two trucks 23, 23. Each truck 23 is provided with two axles each rotatably supporting two tires 10, 10. That is, the two axles of each truck 23 rotatably support four tires in total, that is, two pairs of tires.

Each pair of tires 10 is provided with a signal transmission device 24 composed of a pair of resonance coil assembly 14 and oscillation coil assembly 15.

In addition, each car 22 is provided with one controller 16 having four input terminals each connected through a shield wire 25 to the oscillation coil assembly 15 of the signal transmitter 24 of each pair of tires.

The train 31 is provided at a driver's seat 26 of both the front and rear end cars 22, 22 with a display device 17. The display devices 17, 17 provided in the front and rear end cars 22, 22 are connected with each other through a through wire 27 extending through intermediate cars 22, 22. To the through wire 27 is connected each controller 16 of each car so as to supervise the output delivered from the controller 16 of each car 22 by means of the display device 17 provided at the driver's seat 26.

Figure 4:
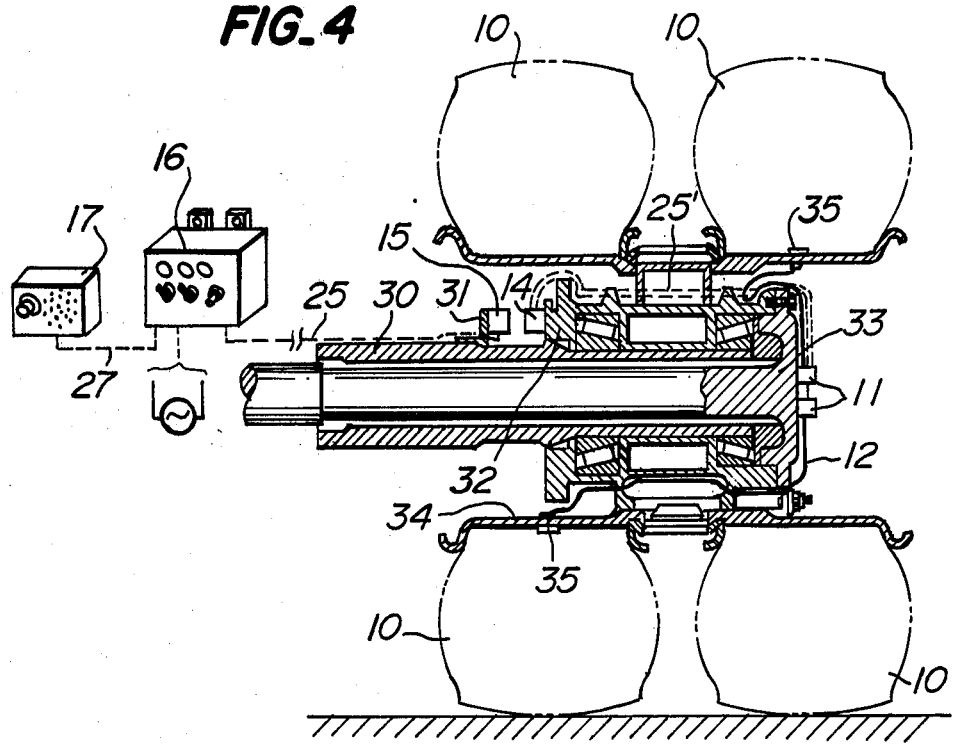
FIG. 4 is a diagrammatic cross-sectional view of the apparatus according to the invention mounted on a rotational body of a vehicle, a controller and display device being shown in perspective view.

FIG. 4 shows a positional relation between the rubber hose 12, pressure indicator 11, pressure switch 13 and resonance coil assembly 14 mounted on the rotational body of the tire internal pressure control apparatus according to the invention.

The oscillation coil assembly 15 mounted on the stationary car body is secured through a bracket 31 to the axle 30. To the oscillation coil assembly 15 is opposed the resonance coil assembly 14 which is secured to a rear cover 32 for a tire axle bearing.

It is preferable that the oscillation coil assembly 15 is spaced apart from the resonance coil assembly 14 by a distance of 13 mm±5 mm. The resonance coil assembly 14 is composed of a resonance coil and a condenser connected in series (not shown) and directly connected to the pressure switch 13 so as to form a resonance circuit.

Figure 5:
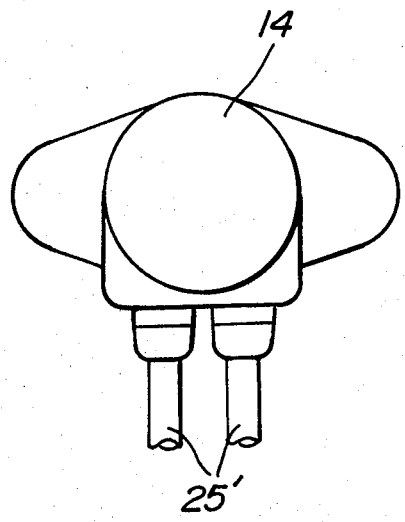
FIG. 5 is a plan view of a resonance coil assembly of the apparatus according to the invention.

FIG. 5 shows a resonance coil assembly 14 formed of resin and made integral into one body by molding. Such resonance coil assembly 14 has an excellent water resistant property and oscillation resistant property.

Figure 6:
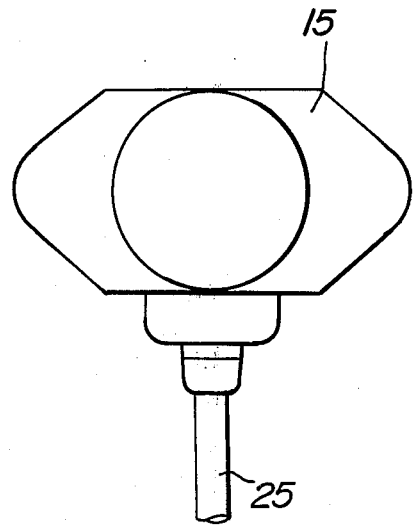
FIG. 6 is a plan view of an oscillation coil assembly of the apparatus according to the invention.

FIG. 6 shows an oscillation coil assembly 15 composed of an oscillation coil and an electric circuit such as an oscillation circuit, detector, comparator, integrator or the like (not shown) and formed of resin and made integral into one body by molding. Such oscillation coil assembly 15 has an excellent water resistant property and oscillation resistant property.

As described above, the resonance coil assembly 14 is opposed to and spaced apart from the oscillation coil assembly 15 by a distance of 13 mm±5 mm, and as a result, the resonance coil assembly 14 passes in front of the oscillation coil assembly 15 provided at the stationary car body side everytime the tire 10 is rotated by one turn and is electromagnetically coupled to the latter, thereby transmitting signals between the resonance coil assembly 14 and the oscillation coil assembly 15 without contacting these assemblies with each other.

The resonance coil assembly 14 is connected through two shield wires 25', 25' to electric signal output terminals of the pressure switches 13, 13 incorporated into the two pressure indicators 11, 11, respectively, which will hereinafter be described in detail.

As shown in FIG. 4, to the input side of the pressure indicator 11 is connected one end of the rubber hose 12 the other end of which is connected to a tire valve 35 secured to a rim 34 of the tire 10. As a result, the internal pressure of the tire 10 is supplied through the tire valve 35 and rubber hose 12 to the pressure indicator 11 and indicated by the latter.

Figure 7:
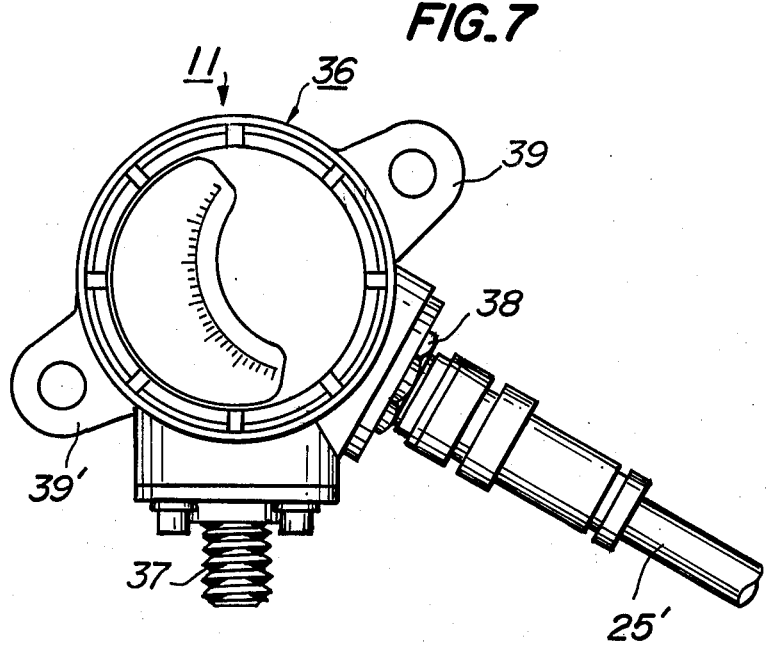
FIG. 7 is a plan view of a pressure indicator of the apparatus according to the invention.

FIG. 7 shows a pressure indicator 11 composed of an indicator body 36 provided along its periphery with a connection pipe 37 for the rubber hose 12, outlet opening 38 for the shield wire 25' and fitting flanges 39, 39'. The pressure indicator 11 is of bellows type and provided with a pointer (not shown) which functions to indicate the internal pressure of the tire delivered from the tire through the rubber hose 12 and connection pipe 37. In addition, the internal pressure of the tire is shunted in the pressure indicator 11 to the diaphragm type pressure switch 13 shown in FIG. 2.

The pressure switch 13 functions to make a contact point ON when the tire internal pressure becomes higher than 8.5 kg/cm$^2$ and make the contact point OFF when the tire internal pressure becomes lower than 8.5 kg/cm$^2$. In addition, the pressure indicator 11 as a whole is of a waterproof one.

On end of the rubber hose 12 is connected to the tire valve 35 and the other end of the rubber hose 12 is bifurcated into two branch hoses one of which is connected to the pressure indicator 11, the other branch hose constituting an air inlet opening for the tire 10 and being operative to supplement air when the internal pressure of the tire is decreased.

In a car whose rotational body side is constructed as above described, under the condition that the internal pressure of a pair of tires 10 is higher than 8.5 kg/cm$^2$ and both the pressure switches 13, 13 are ON, if the resonance coil assembly 14 moves in front of the oscillation coil 15 normally delivering a high frequency signal, there occurs resonance phenomenon in the resonance coil assembly 14 and a resonance current flows therethrough. As a result, the oscillation output from the oscillation coil assembly 15 is decreased by an amount corresponding to the resonance current.

On the contrary, if the internal pressure of the tire becomes lower than 8.5 kg/cm$^2$ and the pressure switch 13 is changed over to its OFF condition, the resonance circuit of the resonance coil assembly 14 becomes open to stop the flow of current therethrough. As a result, even when the resonance coil assembly 14 moves in front of the oscillation coil assembly 15, there occurs no resonance phenomenon and hence the oscillation output from the oscillation coil assembly 15 is not decreased. Thus, it is possible to detect whether or not the internal pressure of the tire is decreased by detecting the difference between oscillation output signals delivered from the oscillation coil assembly 15 and then suitably controlling the difference thus detected.

Such signal difference in the oscillation coil assembly 15 is treated by an electric circuit incorporated therein and then is supplied through a shield wire 25 to the controller 16 which operative to effect signal treatment so as to generate an alarm signal in the case of emergency. This alarm signal causes the controller 16 to turn on a display lamp provided on the controller 16 and at the same time this alarm signal is transmitted through the through wire 27 to the display device 17 provided on the driver's seat 26 of the train to operate it and give an alarm to the driver that the internal pressure of the tire is decreased.

Figure 8:
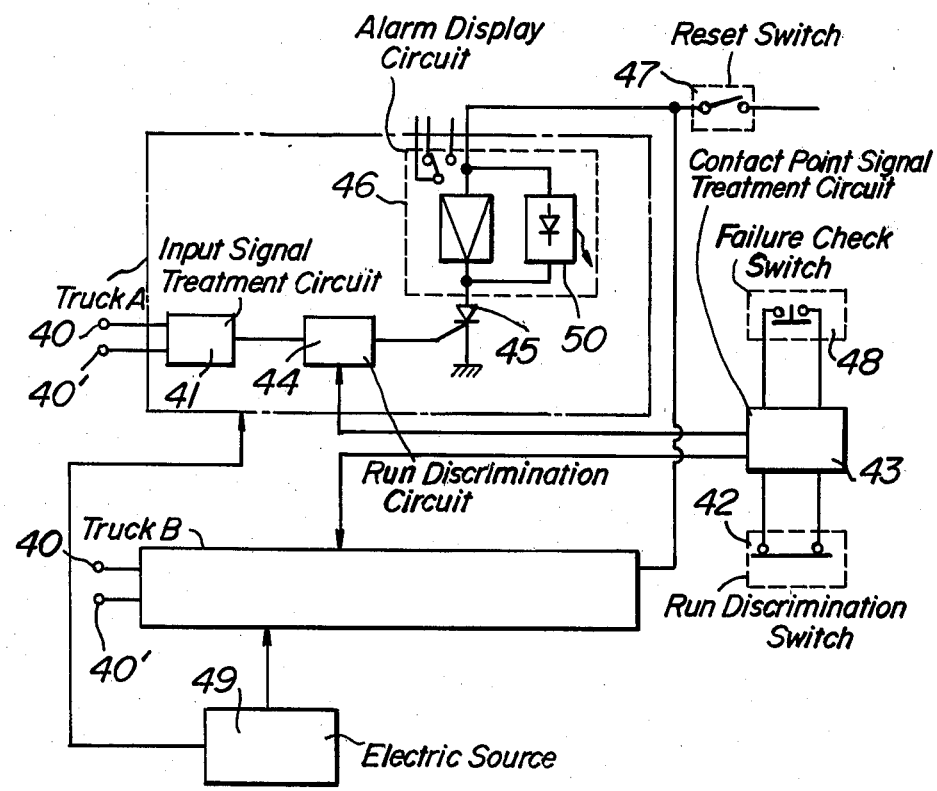
FIG. 8 is a block diagram of a controller of the apparatus according to the invention.

FIG. 8 shows a detailed construction of the controller 16. As shown in FIG. 8, the controller 16 comprises input terminals 40 and 40' which receive the output signal delivered from the oscillation coil assembly 15, an input signal treatment circuit 41 connected to the input terminals 40 and 40', a run discrimination switch 42 operative to be changed over to ON when the tire runs at a speed lower than a given speed and prohibit the generation of the alarm, a contact point signal treatment circuit 43 connected to the run discrimination switch 42 and operative to generate an electric signal when the switch 42 is made ON or OFF, a run discrimination circuit 44 operative to receive the output signal delivered from the contact point signal treatment circuit 43 so as to discriminate the vehicle's run and treat the signal delivered from the input signal treatment circuit 41 by means of the result obtained by the discrimination of the vehicle's run, a signal hold circuit 45 having a gate and operative to be rendered conductive when the gate receives a signal delivered from the run discrimination circuit 44 and hold the current flowing a main current path thereof, an alarm display circuit 46 connected to the main current path of the signal hold circuit 45, a reset switch 47 connected to the alarm display circuit 46 and operative to reset the signal hold circuit 45, a failure check switch 48 connected to the contact point signal treatment circuit 43 and operative to check the failure induced in the tire internal pressure control device when the vehicle is stopped, and an electric source 49 for supplying current to the controller 16.

In FIG. 18, the circuits used in the truck B are the same as those used in the truck A which is shown by dot and dash lines.

The controller 16 constructed as shown in FIG. 8 is operative to discriminate whether or not the internal pressure of the tire is decreased and the result thus obtained is displayed by the alarm display circuit 46 provided in the controller 16 in itself and at the same time is supplied to the display device 17, thereby giving an alarm to the driver of the vehicle.

In the apparatus according to the invention, when the vehicle is stopped the resonance coil assembly 14 does not pass in front of the oscillation coil assembly 15 and probability that the resonance coil assembly 14 stops at a position adjacent to the oscillation coil assembly 15 is also small. As a result, there occurs no resonance phenomenon due to both the coil assemblies and hence the signal tends to be generated in the same manner as the case when the internal pressure of the tire is decreased. In order to prevent such generations of signal, a run discrimination signal operative to discriminate whether the vehicle is run or stopped is supplied to the controller 16 for the purpose of generating the alarm signal only when the internal pressure of the tire is decreased during running of the vehicle. This run discrimination signal is supplied from a door fastening and safety device through a relay. It is a matter of course that use may be made of any other means for supplying the run discrimination signal. In the embodiment shown in FIG. 8, the run discrimination switch 42 is made ON or OFF by the above mentioned relay of the door fastening and safety device.

Figure 9:
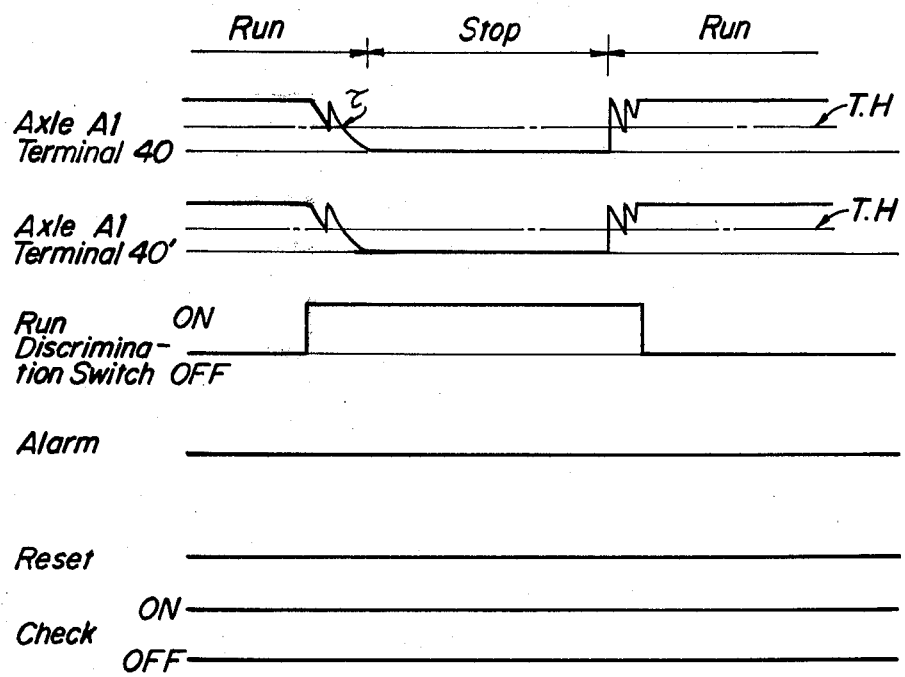
FIG. 9 is a graph illustrating the normal running operation of a controller of the apparatus according to the invention.
Figure 10:
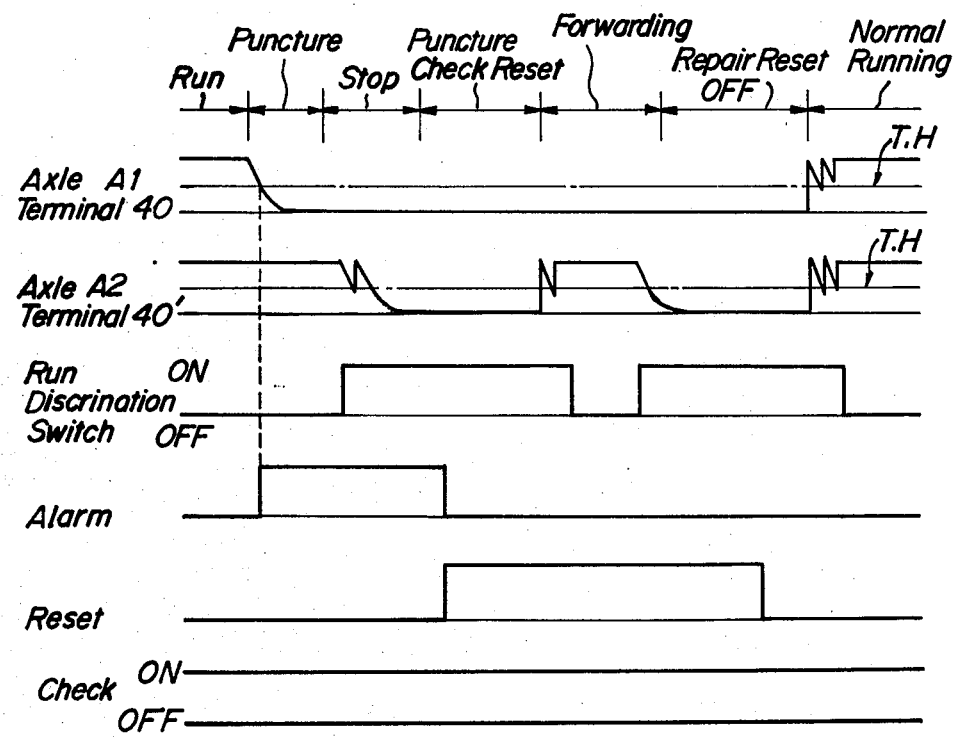
FIG. 10 is a graph illustrating the abnormal running operation of a controller of the apparatus according to the invention.

The controller 16 will operate as follows. In the first place, the operation of the controller 16 when the internal pressure of the tire is not decreased and the train is normally running will be described with reference to FIG. 9.

Let it be assumed that the run discrimination switch 42 becomes OFF when the train runs at a speed higher than 5 km/h and becomes ON when the train runs at a speed lower than 5 km/h and that the signals supplied from the oscillation coil assembly 15 to the input terminal 40 or 40' are high in level when the vehicle is run and are low in level when the vehicle is stopped.

As a result, if the run discrimination switch 42 is ON under the condition that the train run at a speed lower than 5 km/h, the output delivered from the run discrimination circuit 44 becomes low in level irrespective of the level of the signal at the input terminal 40, thereby delivering no alarm. When the speed of the train is lower than 5 km/h, the potential at the input terminal 40 reciprocates between the high level and the low level and arrives at a complete low level or at a complete high level after the lapse of a time constant $\tau$. The alarm is generated when the potential at the input terminal 40 is low in level. But, when the run discrimination switch 42 is ON, the alarm is not generated irrespective of the level of the potential at the input terminal 40. When the run discrimination switch 42 is OFF, the alarm is generated when the potential at the input terminal 40 is low in level and the alarm is not generated when the potential at the input terminal 40 is high in level.

As a result, if the internal pressure of the tire is lower than a given value, the potential at the input terminal 40 becomes low in level after the lapse of time constant $\tau$ and hence is ready to generate an alarm signal. In this case, whether or not the alarm signal is generated is determined by the ON or OFF condition of the run discrimination switch 42.

That is, if the run discrimination switch 42 is OFF and the potential at the input terminal 40 is low in level, the alarm signal is generated. If the alarm signal is generated, a light emitting diode 50 of the alarm display circuit 46 emits light and a relay is operated (to be described later). The operation signal of the relay is transmitted via the through wire 27 to the display device 17 of the driver's seat 26 to give an alarm by means of a lamp, buzzer, bell or the like.

The signal hold circuit 45 functions to hold the alarm after it has been generated until the reset switch 47 is operated independently of the potential level of the input terminal 40 and of the ON or OFF condition of the run discrimination switch 42. The signal hold circuit 45 is preferably composed of a thyristor.

If the alarm is generated, the driver causes the train to stop and confirms the train including the tire whose internal pressure is decreased. Then, the reset switch 47 is operated to release the alarm and the train is forwarded to a repair shop where the defective tire is repaired. Then, the apparatus is set to its operable condition and the running operation of the train is started again.

In addition, the apparatus according to the invention is capable of checking whether or not the apparatus is normally operable at the time of checking the train in order to start its running operation.

Figure 11:
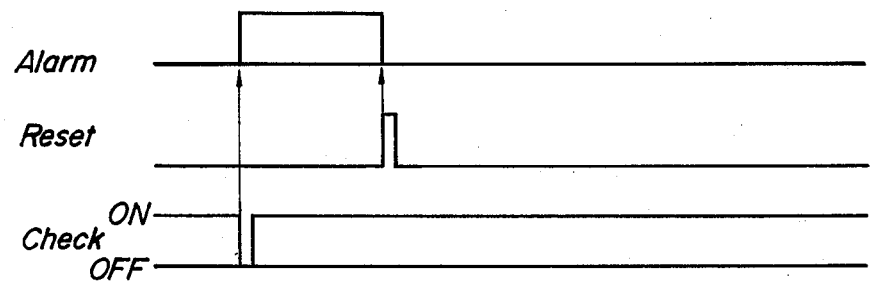
FIG. 11 is a graph illustrating the operation of a controller according to the invention when it is checked.

In this case, if the alarm is generated as shown in FIG. 11 when the failure check switch 48 is operated, this shows that the apparatus is in normal condition. On the contrary, if the alarm is not generated when the failure check switch 48 is operated, this shows that the apparatus is out of order.

In addition, the apparatus according to the invention is constructed such that when the shield wire 25 between the oscillation coil assembly 15 and the controller 16 is broken or the connection cable between the run discrimination switch 42 and the controller 16 is broken, the alarm is generated in each case. That is, if the shield wire 25 is broken, the alarm is generated during the driving operation of the train. If the connection cable is broken, the alarm is generated when the train is stopped.

The apparatus according to the invention has a number of advantages. In the first place, the driver at his driver's seat can detect whether or not the internal pressure of the tire is decreased. Secondly, it is possible to generate the alarm even when the apparatus per se having a fail-safe ability becomes defective. Third, each tire is provided with a pressure indicator, so that the apparatus requires little maintenance. Fourth, since the operable pressure of the pressure switch is high, it is possible to discover the natural decrease of the internal pressure of the tire at its early stage. Fifth, the signal is transmitted between the rotational body and the stationary car body without contact, so that the apparatus can operate without trouble and no periodical interchange between these bodies is necessary. Sixth, the tire can detachably be mounted on the wheel by connecting and disconnecting the rubber hose to and from the tire valve, so that the apparatus is easy in operation. Seventh, since the internal pressure of the tire is checked by both the pressure indication and the electric signal, the apparatus is highly reliable in operation. Eighth, the resonance coil assembly is distant apart from the oscillation coil assembly by 13 mm±5 mm, so that the apparatus is easy in assembling and highly reliable in operation. Nineth, the pressure switch is of an automatic reset one and hence the apparatus provides a material decrease in time. Tenth, since the alarm signal is held, the apparatus can precisely check whether or not the internal pressure of the tire is decreased for sufficient time. Eleventh, expensive parts such as an integrated circuit are not used, so that the apparatus is less expensive. Finally, since a complex circuit such as an integrated circuit is not used, the apparatus can operate with less fault and misoperation.

What is claimed is:

1. A tire internal pressure monitoring apparatus for tired vehicles, comprising: a rubber hose connected to a valve provided on a tire for vehicles, a pressure indicator secured to that position of a rotational body of the vehicle which is near the center of the rotational shaft of said rotational body and operative to indicate the internal pressure of the tire supplied from the tire through said rubber hose, a pressure switch incorporated into said pressure indicator and operative to transduce a decrease in the internal pressure of the tire to a value lower than a given value into an electrical signal, a resonance coil assembly electrically connected to said pressure switch and secured to a given position on the periphery of said rotational body so as to transmit a signal for detecting a decrease of the internal pressure of the tire to a stationary body side of the vehicle, an oscillation coil assembly secured to that position of the vehicle body side which is near said rotational body and operative to normally generate a high frequency signal, said resonance coil assembly being brought into a position opposed to and near said oscillation coil assembly everytime said rotational body is rotated by one turn to generate a signal sensitive to the internal pressure of the tire in response to the presence or absence of the resonance of said resonance coil assembly, a controller connected to said oscillation coil assembly and operative to treat said signal delivered from said oscillation coil assembly and a signal representing presence or absence of the run of the vehicle so as to generate an alarm signal, and a display device connected to said controller and displaying said alarm signal delivered from said controller to a driver, wherein said controller comprises an input signal treatment circuit for treating said signal delivered from said oscillation coil assembly, a run discrimination switch operative to become ON at a speed lower than a given speed and prohibit generation of said alarm, a contact point signal treatment circuit connected to said run discrimination switch and generating an electrical signal when said run discrimination switch is ON or OFF, a run discrimination circuit connected to said contact point signal treatment circuit and operative to discriminate the vehicle's run and treat the signal delivered from said input signal treatment circuit, a signal hold circuit including a gate and operative to be rendered conductive when said gate receives the signal delivered from said run discrimination circuit and hold the current flowing main current path thereof, an alarm display circuit connected to said main current path of said signal hold circuit, a reset switch connected to said alarm display circuit and resetting said signal hold circuit, a failure check switch connected to said contact point signal treatment circuit and operative to check the failure induced in the apparatus when the vehicle is stopped, and an electric source operative to supply current.

2. The apparatus according to claim 1, wherein said resonance coil assembly is composed of a resonance coil and a condenser connected in series and formed of resin, said resonance coil assembly being molded into one integral body and connected in series with an exterior pressure switch so as to constitute a resonance circuit.

3. The apparatus according to claim 1, wherein said oscillation coil assembly is composed of an oscillation coil and an electrical circuit required for oscillating said oscillation coil and is molded into one integral body by means of resin.

4. The apparatus according to claim 1, wherein said signal hold circuit is composed of a thyrister.

5. The apparatus according to claim 1, wherein said alarm display circuit is composed of a light emitting diode and a relay connected in parallel.

* * * * *

UNITED STATES PATENT AND TRADEMARK OFFICE
CERTIFICATE OF CORRECTION

PATENT NO. : 4,348,654

DATED : September 7, 1982

INVENTOR(S) : Matsuda et al

It is certified that error appears in the above-identified patent and that said Letters Patent is hereby corrected as shown below:

On the title page;

Please add the following name and address as the second Assignee:

-- Mitaka Instrument Company Limited, Tokyo, Japan --

Signed and Sealed this

Twenty-fifth Day of June 1985

[SEAL]

*Attest:*

DONALD J. QUIGG

*Attesting Officer*     *Acting Commissioner of Patents and Trademarks*